DEFENSIVE PUBLICATION T862009

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 23

752,509

REGENERATION OF PHOTOGRAPHIC SILVER BLEACH SOLUTIONS

Charleton C. Bard, Rochester, and Julius C. Battaglini, Fairport, N.Y., both of 1669 Lake Ave., Rochester, N.Y. 14615

Filed Aug. 14, 1968. Published May 6, 1969
Int. Cl. G03c *5/26, 5/38*
U.S. Cl. 96—60
No Drawing. 8 Pages Specification

Ferricyanide bleach which has been utilized in photographic processing is regenerated by treatment under acidic conditions with hydrogen peroxide or with an alkyl peracid, such as performic acid, peracetic acid or perpropionic acid, to oxidize alkali ferrocyanide to alkali ferricyanide.

Conventional ferricyanide bleach solutions contain an alkali metal ferricyanide, such as lithium ferricyanide, sodium ferricyanide or potassium ferricyanide, and an alkali metal bromide and may also contain buffers, bleaching accelerators and corrosion inhibitors. In use, the ferricyanide serves to oxidize metallic silver to silver ion and is reduced to ferrocyanide so that there is a gradual accumulation of ferrocyanide ion in the solution. Any of such bleach solutions can be successfully regenerated with hydrogen peroxide or an alkyl peracid utilizing an amount sufficient to oxidize substantially all of the alkali ferrocyanide to alkali ferricyanide, with stoichiometric or substantially stoichiometric proportions ordinarily being optimum. It is preferred that the treatment with hydrogen peroxide or alkyl peracid be carried out with the bleach solution at a pH of less than 5, and preferably of about 3 or less, and to provide the desired pH by addition of a strong acid, such as sulfuric acid, to the solution.

The reaction of hydrogen peroxide or an alkyl peracid with alkali ferrocyanide is also useful as a method for manufacture of alkali ferricyanide or for preparation of fresh ferricyanide bleach.